Sept. 18, 1951   M. SIGMUND   2,568,171
DETACHABLE WATER SPRINKLER
Filed March 30, 1948.

INVENTOR.
MIROSLAV SIGMUND
BY Otto Munk
HIS ATTY

Patented Sept. 18, 1951

2,568,171

UNITED STATES PATENT OFFICE 2,568,171

DETACHABLE WATER SPRINKLER

Miroslav Sigmund, Gosforth, England

Application March 30, 1948, Serial No. 17,907
In Great Britain April 14, 1947

2 Claims. (Cl. 299—68)

The present invention relates to improvements in and relating to water pipe couplings and hydrants of the kind permitting rapid connection and disconnection of water pipes, hoses, spray nozzles and like water delivery elements to and from a main.

The invention is particularly though not excessively adapted for use in connection with land irrigation plant in which water is delivered through main pipes under or more usually on the surface of the ground, a number of hydrants being provided to which hoses, delivery pipes or spray nozzles may be connected to deliver water at the selected parts of the area to be irrigated.

It is the primary object of the invention to provide a coupling or hydrant construction permitting easy connection and disconnection of the delivery element to and from the main and one in which the delivery element may be rotated and the flow of water from the main is effectively prevented when the delivery elements are disconnected and is easily and effectively controlled when the delivery elements are connected with the main.

The invention consists in a pipe coupling or hydrant comprising a body portion adapted to be permanently or detachably secured to a water supply pipe or main, a valve within said body portion for opening and closing the water passage therethrough and arranged to be held in the closing position by the water pressure in the said supply pipe or main, a cover portion adapted for connection with and disconnection from said body portion, a delivery element such as a pipe, union or nozzle connected with said cover portion in such a manner as to be capable of swivelling or rotation about the axis of the coupling or hydrant and a control cock carried by said swivelling or rotatable element and adapted to control the valve in the body portion when the cover portion together with the swivelling or rotatable delivery element is in position on said body portion.

Figure 1:
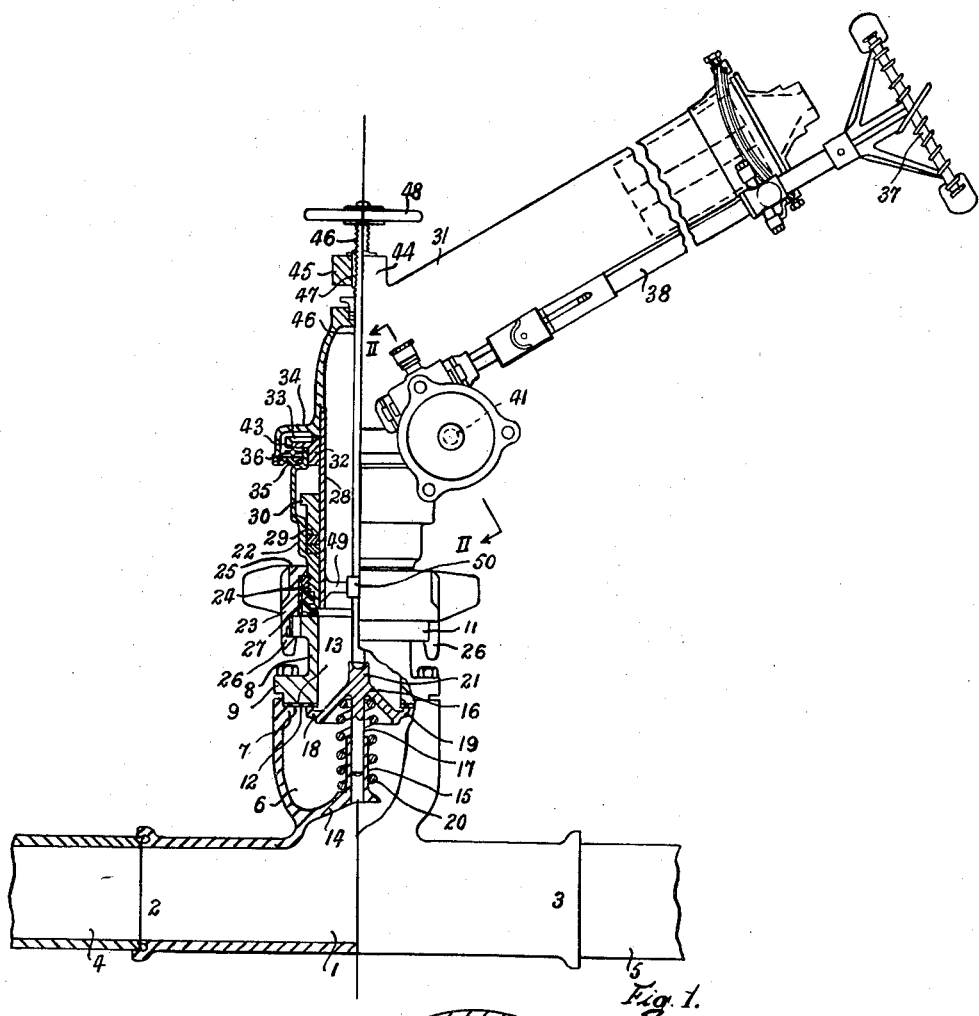
Figure 2:
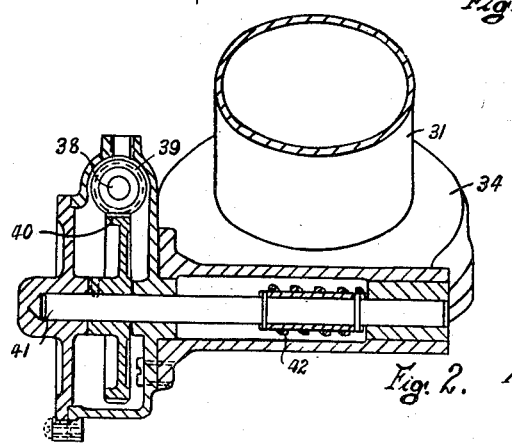

The invention is illustrated by way of example in the accompanying drawings as applied to a combined hydrant and rotary spray nozzle, Figure 1 being a view in part sectional elevation of the complete hydrant and nozzle in the position for use and Figure 2 being a view in section on the line 2—2 of Figure 1 of a part of the structure.

Referring to the drawings the body portion of the hydrant shown is a two-part metal casting, the first part 1 being a T or three branch member the two opposed ends 2 and 3 of which are adapted to make spigot and socket connection in known manner with the ends of parts 4 and 5 of the main pipe. The third branch 6 is of hollow part spherical form and has an upper recessed flange 7. The second part 8 is of cylindrical form with a lower flange 9 for register within the recessed flange 7 of the first part 1 and an upper outwardly extending circular edge flange 11.

The said second part 8 is of substantially smaller diameter than the first part 1 and the two parts 8 and 1 are secured together by bolting the flanges 7 and 9 together, the flanges for this purpose being preferably of external rectangular contour. A flat ring or washer 12 of rubber or other water impervious yielding material is interposed between the flanges 7 and 9, the inner portion of which ring or washer projects inwardly of the flange 7 of the first part 1 of the body and abuts the shoulder 13 formed at the underside of the flange 9 of the second part 8 of the body.

The first body part 1 is provided with an interior projection 14 having a boss 15 bored axially of the two body parts 1 and 8 and this bored boss 15 forms a guide for a valve 16 in the form of a hollow cone having an axial pin 17 on its interior underside, which slides in the boss 15.

The conical valve 16 is provided on its exterior with an annular shoulder 18 near its edge, preferably machined to form an axially extending edge bead 19, for engagement with the undersurface of the above described seating ring or washer 12.

A compression spring 20 surrounds the bored boss 15 and the central guide pin 17 extending from within the cone shaped valve 16, serving to bias the valve 16 towards the seating ring 12, and in the engaged position the water passage through the hydrant body is closed, the water pressure therein urging the valve 16 on to the seating ring 12.

The conical valve 16 at its upper end is formed with a short axial extension 21 the end of which is made slightly concave.

The cover portion of the hydrant or coupling comprises a sleeve 22 surrounded at its lower end by a connection ring 23 rotatable on the sleeve and secured thereon by a collar 24 disposed between the outer wall of the sleeve 22 and the inner wall of the ring 23 and screwed to the sleeve 22 and engaging an inwardly directed upper edge flange 25 on the ring 23.

The connection ring 23 is provided with a pair of oppositely disposed axially directed hooked lugs 26 adapted to pass in the axial direction through interruptions formed in the periphery of the upper flange 11 on the second or upper body part 8 and, upon subsequent rotation of the ring 23 the hooks on the lugs 26 engage beneath said flange 11 to retain the cover portion of the hydrant on the body portion. The interrupted flange 11 may be of tapering thickness, at least in the region of the interruptions to provide a wedging action, and a rubber or like sealing ring 27 may be provided between the end of the sleeve 22 of the cover portion and the upper flange 11 on the body part 8.

Within the sleeve 22 is rotatably mounted a tube 28, packing rings 29 and a gland 30 being provided between the tube 28 and the enlarged part of sleeve 22.

The delivery element in the case illustrated is a spraying nozzle 31 the entry elbow of which is fixedly connected with the upper end of the tube 28.

On the tube 28 is fixedly mounted a ring 32 having an outwardly directed flange 33 and the elbow of the spraying nozzle 31 is provided with a curved section flange 34 which covers the radial flange 33 on the ring 32. The space within the curved section flange 34 is closed from below by a retaining ring 35 fixed to the upper end of the sleeve 22 and between this ring 35 and radial flange 33 on the ring 32 is mounted a ball or other anti-friction thrust bearing 36. The spraying nozzle 31 shown by way of example is of the kind including a vaned diffusing or atomising member 37 the vaned edge of which projects into the path of the water jet emerging from the nozzle 31 so that the diffusing member 37 is rotated by the reaction pressure of the jet, such rotation being utilised to rotate the nozzle 31 about the axis of the hydrant.

For this purpose the diffusing member 37 is fixedly mounted on a shaft 38 carried in bearings on the nozzle, the lower end of the shaft carrying a worm 39 engaging with a worm wheel 40 (Figure 2) on a transverse spindle 41 also carrying a worm 42 making engagement with worm teeth 43 on the radial flange 33 on the ring 32.

On the elbow of nozzle 31 is provided a fixed bracket 44 terminating in a bored boss 45 coaxial with the hydrant or coupling body, and this boss is screw-threaded internally for the reception of a screwed valve control rod 46 adapted to extend axially of the hydrant through a bushed and packed aperture 47 in the elbow of the nozzle and into contact with the conical valve 16, the rod 46 being provided at its upper end with a hand wheel 48 whereby the rod may be screwed in the boss 45 to move the rod longitudinally of the axis of the hydrant.

The free end of the rod 46 is of pointed or of hemispherical form and is adapted to engage in the smooth concavity at the end of the axial projection 21 on the conical valve 16.

With the cover portion comprising the sleeve 22, tube 28 and the swivelling nozzle or other delivery element 31 detached from the body portion of the hydrant, the conical valve 16 is urged against its seating ring 12 in the said body portion 6 and 8 of the hydrant and the outflow of water from that point on the main 45 is prevented.

When required for use the said cover portion, with the valve control rod 46 in a withdrawn or screwed-back position, is applied to the body portion, the hooked lugs 26 on the rotatable ring 23 being passed through the interruptions in the interrupted flange 11 and the ring 23 rotated to the retaining position. The valve control rod 46 may now be operated by screwing in the threaded boss 45 on the bracket 44 and through the packed aperture 47 in the elbow of the spraying nozzle 31 until the free end of the rod 46 engages the end extension 21 of the valve 16 to thrust the latter downwards and off its seat. During rotation of the spraying nozzle 31 on the bearing 36 and relative to the now fixed sleeve 22, the valve control rod 46 moves as one with said nozzle 31, the free end of the rod 46 rotating in the concavity in the end of the valve extension 21, so that the valve setting remains unchanged.

In the preferred arrangement the ube 28 forming a part of the cover portion of the hydrant and fixed to the delivery element 31 is provided with an interior bridging piece 49 supporting a central bored boss 50 to serve as a positive guide for the free end of the valve control rod 46.

Whilst in the above described embodiment a delivery element in the form of a driven spraying nozzle is employed it is to be understood that the invention is equally suitable for use with other forms of delivery element. For example, the rotary delivery element may be a simple hose or pipe coupling permitting easy change of direction of the hose or pipe relative to the main and in such case driving means such as is described above for imparting rotation to the spraying nozzle is unnecessary and may be omitted.

I claim:

1. A pipe coupling or hydrant comprising a body portion, a valve within said body portion for opening and closing the water passage therethrough and adapted to be held in the closing position by the water pressure, a cover portion, a connecting member adapted to enable said cover portion to be readily connected with and disconnected from said body portion, a delivery element including a tube extending into and rotatable within said cover portion, packing means between said tube and said cover portion, connection means including a bearing between said delivery element and said cover portion adapted to permit rotation of said delivery element about the axis of the coupling or hydrant, a rotary diffuser carried by said delivery element and adapted to be rotated by impact of a water jet from said delivery element, means transmitting rotation of said diffuser to said delivery element and relative to said cover portion, control cock carried by said rotatable delivery element and adapted to make controlling engagement with the valve in the body portion when the cover portion together with the rotatable delivery element is mounted on the body portion.

2. A pipe coupling or hydrant comprising a body portion, a valve within said body portion for opening and closing the water passage therethrough and adapted to be held in the closing position by the water pressure, a cover portion, a coupling ring carried by and freely movable on said cover portion and an interrupted flange on the said body portion, hook elements on said coupling ring adapted to be passed through the interruptions in said flange and to engage said flange upon rotation of said ring to connect said cover portion with the said body portion, a delivery element including a tube extending into and rotatable within said cover portion, packing means between said tube and said cover portion, an outer flange on said delivery element, a ring on the cover portion and an anti-friction bearing between said flange and said ring, a rotary diffuser carried by said delivery element and adapted to be rotated by impact of a water jet from said delivery element, means transmitting rotation of said diffuser to said delivery element and relative to said cover portion, and a control cock carried by said rotatable delivery element and adapted to make controlling engagement with the valve in the body portion when the cover portion together with the rotatable delivery element is mounted on the body portion.

MIROSLAV SIGMUND.

REFERENCES CITED

The following references are of record in the file of this patent:

UNITED STATES PATENTS

| Number | Name | Date |
|---|---|---|
| 129,938 | Donnelly | July 30, 1872 |
| 273,839 | Hennessy | Mar. 13, 1883 |
| 1,077,936 | Hudson | Nov. 4, 1913 |
| 1,120,861 | Thalman | Dec. 15, 1914 |
| 1,406,869 | Jester | Feb. 14, 1922 |
| 1,846,699 | Uhden | Feb. 23, 1932 |
| 2,214,250 | Landrum | Sept. 10, 1940 |
| 2,234,226 | Bloch | Mar. 11, 1941 |

FOREIGN PATENTS

| Number | Country | Date |
|---|---|---|
| 9,778 | Australia | Aug. 22, 1928 |
| 157,132 | Austria | Sept. 25, 1939 |
| 673,754 | Germany | Mar. 27, 1939 |